Figure 1:
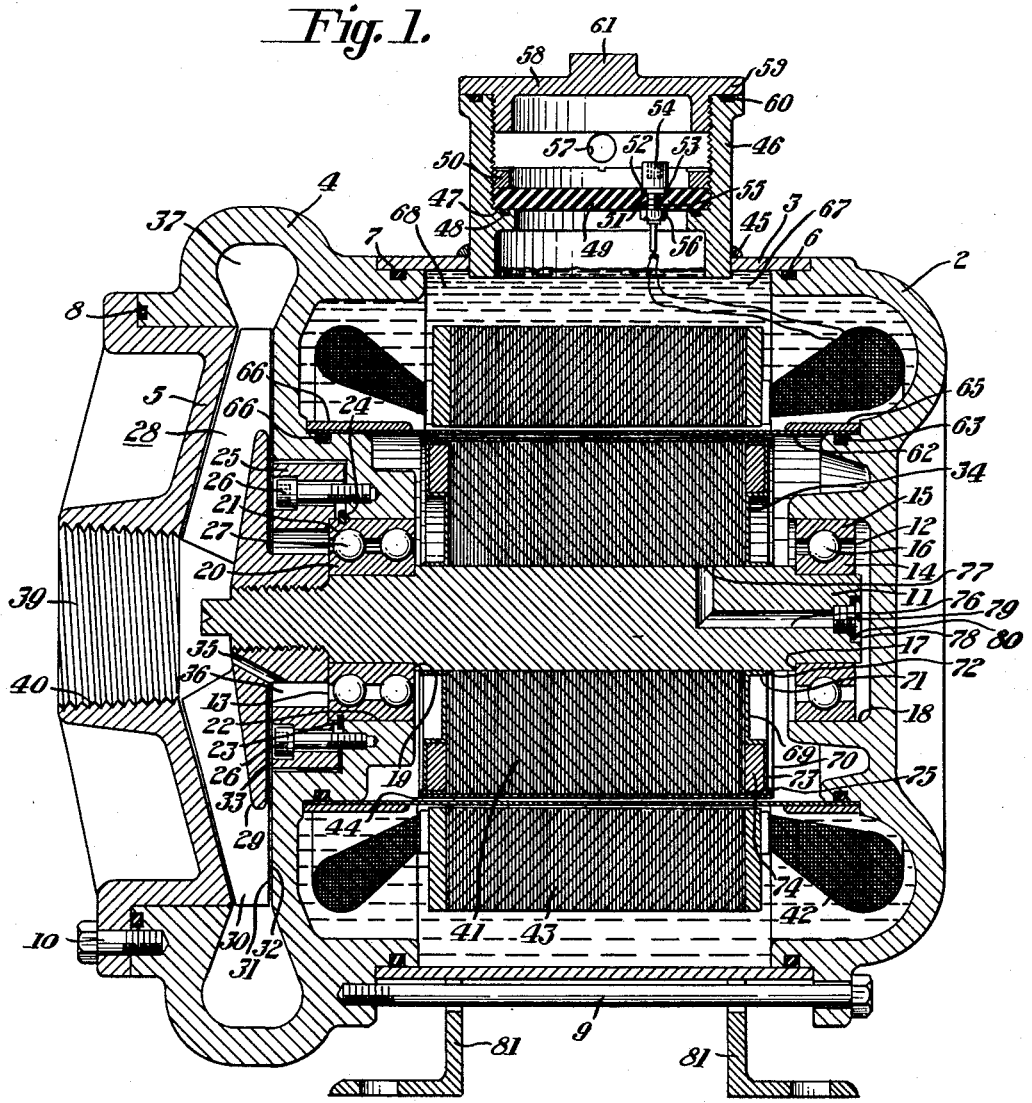

INVENTOR
John J. Zimsky

Nov. 29, 1955    J. J. ZIMSKY    2,725,012
MOTOR-PUMP UNIT

Filed March 22, 1952    2 Sheets-Sheet 2

INVENTOR
John J. Zimsky
his attorneys

United States Patent Office 2,725,012
Patented Nov. 29, 1955

2,725,012

MOTOR-PUMP UNIT

John J. Zimsky, Canonsburg, Pa., assignor, by mesne assignments, to McGraw Electric Company, a corporation of Delaware Application March 22, 1952, Serial No. 277,932

6 Claims. (Cl. 103—87)

This invention relates to a motor-pump unit and particularly such a unit comprising an electric motor with a centrifugal pumping element connected to the motor shaft to be driven thereby. The invention provides certain constructional features whereby important advantages in operation are realized.

In my copending application Serial No. 277,931, filed March 22, 1952, I have disclosed a motor-pump unit in which a portion of the fluid being pumped is employed for cooling and lubricating the motor bearings and cooling the motor. In that case a portion of the fluid being pumped is circulated in contact with the bearings, the rotor and the stator of the motor-pump unit.

It may be desirable to employ a different coolant for the stator such as a coolant having different thermal properties than the fluid being pumped. Also it may be desirable to segregate the rotor from the fluid being pumped although utilizing a portion of the fluid being pumped to cool the rotor as well as to cool and lubricate the motor bearings. When the rotor is segregated it is desirable to provide a test passage to test for pressure tightness the chamber containing the rotor.

The motor-pump unit herein disclosed and claimed satisfies all of the above mentioned requirements in a simple yet highly effective manner. I provide a motor-pump unit comprising a motor having a shaft carrying a rotor, a stator disposed about the rotor, a centrifugal pumping element carried by the shaft at one end of the motor, a casing about the centrifugal pumping element, passages at different distances outwardly from the axis of the shaft between the casing and the interior of the motor so that a portion of the fluid being pumped passes from the casing into the motor where it cools the motor and lubricates the motor bearings and then returns to the casing and means maintaining said portion of fluid out of contact with the stator. I further provide a similar motor-pump unit in which the last mentioned means maintain the portion of fluid referred to out of contact with the rotor.

In a preferred structure the motor-pump unit comprises a motor having a shaft carrying a rotor, a stator disposed about the rotor, means for separately physically isolating each of the stator and the rotor, a centrifugal pumping element carried by the shaft at one end of the motor, a casing about the centrifugal pumping element, passage means between the casing and the interior of the motor and means at the interior of the motor including at least a portion of said isolating means maintaining a portion of the fluid being pumped and which passes through said passage means out of contact with each of the rotor and the stator but in contact with the motor bearings to lubricate and cool the same and in thermoconductive relationship to the motor.

I further provide a motor-pump unit comprising a motor having a shaft carrying a rotor, a stator disposed about the rotor, an enclosure about the rotor, a centrifugal pumping element carried by the shaft at one end of the motor, a casing about the centrifugal pumping element and passage means between the casing and the interior of the motor circulating a portion of the fluid being pumped within the motor and against the outside of the enclosure to lubricate and cool the motor bearings and cool the rotor without contact with the rotor. I preferably additionally provide means maintaining in thermo-conductive relationship with the stator a coolant separate from the fluid being pumped.

When an enclosure is provided about the rotor I preferably provide a passage extending from within the enclosure to a point outside the enclosure and removable means normally closing the passage. The passage is preferably disposed in the shaft terminating at one end within the enclosure and at the other end at an exposed portion of the shaft.

I preferably employ a hollow cylinder segregating the rotor from the stator. The portion of the fluid being pumped which cools and lubricates the motor bearings and cools the motor is preferably conducted to the interior of the motor within the hollow cylinder.

Other details, objects and advantages of the invention will become apparent as the following description of a present preferred embodiment thereof proceeds.

Figure 3:
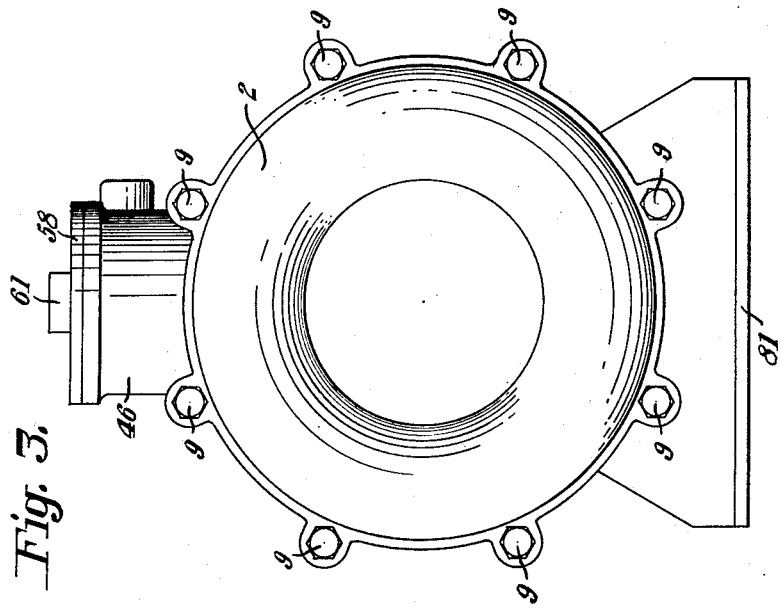
Figure 2:
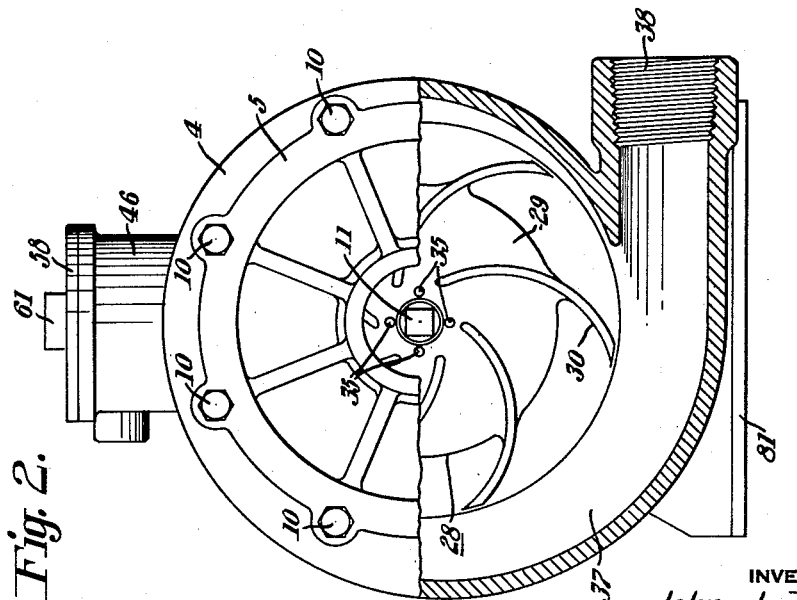

In the accompanying drawings I have shown a present preferred embodiment of the invention in which Figure 1 is an axial cross-sectional view through a motor-pump unit;

Figure 2 is a view partly in end elevation of the left hand end of the motor-pump unit and partly in transverse cross section of the motor-pump unit shown in Figure 1; and Figure 3 is an end elevational view of the right hand end of the motor-pump unit viewing Figure 1.

Referring now more particularly to the drawings, the motor-pump unit comprises cooperating casing members 2, 3, 4 and 5. The casing member 2 forms the right hand end of the motor casing viewing Figure 1, the casing member 3 telescopes over a portion of the casing member 2 as shown in Figure 1 and forms the central generally cylindrical portion of the motor casing and the casing member 4 telescopes within the casing member 3 and forms the left hand portion of the motor casing and defines part of the centrifugal pumping element compartment. The casing member 5 telescopes within a portion of the casing member 4 and cooperates therewith to form the centrifugal pumping element compartment. The casing members 4 and 5 form in effect a casing about the centrifugal pumping element later to be described. The casing members 2 and 3 are sealed together by an O-ring 6, the casing members 3 and 4 are sealed together by an O-ring 7 and the casing members 4 and 5 are sealed together by an O-ring 8. The casing members 2, 3 and 4 are fastened together by bolts 9. The casing members 4 and 5 are fastened together by bolts 10.

The motor-pump unit comprises a shaft 11 mounted in bearings 12 and 13. The left hand end of the shaft viewing Figure 1 extends outwardly beyond the bearing 13 and projects from the motor casing into the centrifugal pumping element compartment or casing. The bearing 12, in which the nonprojecting end of the shaft 11 is mounted, has an inner race 14 and an outer race 15 with bearing balls 16 operating between the races in usual manner. The inner race 14 is pressed onto the shaft 11 and seats against a shoulder 17 on the shaft. The casing member 2 is provided with a recess 18 of cylindrical shape coaxial with the shaft 11, the recess 18 forming a guideway for the outer race 15 and hence for the bearing 12. The guideway maintains the bearing 12 in fixed position relatively to the motor casing transversely but so that it is free for limited axial movement relatively to the motor casing due to thermally induced changes in length of the shaft 11.

The shaft 11 has a shoulder 19 against which the inner race 20 of the bear 13 is positioned. The outer race 21 of the bearing 13 is disposed within a bore 22 in the casing member 4. A circular key or retaining ring 23 is inserted into the outer generally cylindrical surface of the outer race 21 and projects therefrom and bears against the left hand face viewing Figure 1 of the casing member 4 at 24. A holding ring 25 is bolted to the casing member 4 by bolts 26 and bears against the left hand face of the outer race 21 viewing Figure 1 whereby to hold the outer race in place. Bearing balls 27 operate between the inner race 20 and the outer race 21 of the bearing 13 in usual manner.

The centrifugal pumping element is shown at 28 and comprises a hub portion 29 and centrifugal pumping means 30. The hub 29 is internally threaded and is screwed onto the externally threaded left-hand end of the shaft 11 viewing Figure 1. The hub 29 of the centrifugal pumping element 28 maintains the inner race 20 of the bearing 13 in place against the shoulder 19 of the shaft 11. Thus since the inner race 20 of the bearing 13 is fixedly positioned on the shaft 11 and the outer race 21 of the bearing 13 is fixedly positioned with respect to the motor casing the left hand end of the shaft remains in substantially unvarying axial position relatively to the motor casing. Upon thermally induced changes in length of the shaft the bearing 12 moves within the guideway 18 as above described. Thus the unit is free from binding or excessive wear brought about by temperature changes.

The parts are proportioned so that the right hand face 31 of the body portion of the centrifugal pumping element 28 is slightly spaced from the left hand face 32 of the casing member 4 and the left hand face 33 of the holding ring 25 as shown in Figure 1. Also, the holding ring 25 is slightly spaced from the casing member 4 both radially and axially. Further, the holding ring 25 is spaced radially from the hub 29 of the centrifugal pumping element 28. Bores 35 are provided in the hub 29 of the centrifugal pumping element 28 affording communication between the interior of the centrifugal pumping element compartment or casing and the annular space 36 between the holding ring 25 and the outer peripheral surface of the hub 29, which annular space communicates with the interior of the bearing 13.

The casing member 4 is shaped to provide a volute 37 into which the fluid being centrifugally pumped is delivered, the volute discharging the delivered fluid through an outlet 38. The centrifugal pumping element 28 rotates in the counterclockwise direction viewing Figure 2.

The casing member 5 is provided centrally with an axial inlet 39 through which the fluid being pumped enters the centrifugal pumping element compartment or casing. The inlet 39 is internally threaded as shown at 40 so that a pipe or coupling for introduction of the fluid to be pumped into the motor-pump unit may be screwed thereinto.

Fastened to the shaft 11 centrally of the motor casing is a rotor 41. Carried within the motor casing is a stator having windings 42 and laminations 43 which may be conventional. The stator surrounds the rotor 41 forming a radial fluid gap motor. The gap between the rotor and the stator is designated 44.

Welded to the casing member 3 at 45 is an internally threaded collar 46 having an internal outwardly facing annular seat 47 to which is sealed by an O-ring 48 a disc or panel 49 which may be of insulating material such as Bakelite. The disc 49 is pressed against the seat 47 and the O-ring 48 by a nut 50 which is threaded into the collar 46.

The disc 49 has therethrough a bore 51 having an enlarged upper end 52 to which is sealed by an O-ring 53 a stud 54 having a threaded stem 55 passing through the bore, the stud being held in place by a nut 56. The electrical conductors or leads for operating the motor are brought out through the stud 54, or a plurality of such studs may be provided, one for each lead. The leads may emerge from the collar 46 into a suitable conduit sealed to the collar at an opening 57 therein. The upper end of the collar is closed by a cap 58 threaded thereinto, the cap having an outward radial flange 59 sealed to the upper end of the collar by an O-ring 60. The cap 58 may have a polygonal central upward projection 61 for receiving a wrench.

The unit is thus completely sealed and self-contained and may be employed anywhere, even being submerged in water or other liquid. The O-rings prevent moisture or liquid from either entering or leaving the unit. No stuffing boxes or rotating seals are used anywhere in the structure.

The motor-pump unit may be used for pumping any fluid which has a lubricating and cooling value. Oil is such a fluid and it is contemplated that normally the motor-pump unit herein disclosed will be used for pumping oils such as transformer oil, diesel engine oil, etc.

The stator is segregated from the remainder of the motor by a hollow cylinder 62 sealed to the casing member 2 by an O-ring 63 and sealed to the casing member 4 by an O-ring 64. The hollow cylinder 62 may be of any suitable material, stainless steel being preferred. Bands 65 and 66 which may, for example, be of steel hold the hollow cylinder 62 in place and firmly press it against the O-rings 63 and 64. An annular space 67 substantially surrounding the stator contains a coolant 68 separate from the fluid being pumped. The coolant 68 may for example be transformer oil which can operate up to a temperature rise of the order of 55° C. or askarel which is a non-inflammable liquid which will operate at a temperature rise of 55° C. or a silicone oil which is non-inflammable and can operate at temperature up to 200° C. or higher.

The rotor 41 has thereabout an enclosure 34 which may for example be made of stainless steel and which isolates the rotor from the remainder of the motor except the shaft 11. The enclosure 34 comprises opposed end discs 69 and a hollow cylinder 70. Each of the discs 69 has an inner annular foot or flange 71 embracing the shaft 11 and welded thereto at 72. Each of the discs has an enlarged outer annular pocket 73 containing a reinforcing ring 74. Each of the discs 69 is welded to the cylinder 70 by a weld 75. The cylinder 70 is at the inside and the cylinder 62 at the outside of the radial fluid gap 44, such gap being defined by the two cylinders. Within the gap 44 is circulated a portion of the fluid being pumped as will presently be described. A portion of the coolant 68 is disposed outside the cylinder 62 and inside the stator.

I provide a passage extending from within the enclosure 34 to a point outside the enclosure to test the enclosure for pressure tightness. Preferably the passage is in the shaft and I show a passage 76 terminating at one end at 77 within the enclosure and at the other end at 78 at an exposed portion of the shaft. In the structure shown the end 78 of the passage 76 is at the non-projecting end of the shaft 11. The passage 76 is closed by a removable screw plug 79 sealed to the passage by an O-ring 80.

In operation of the motor-pump unit the fluid to be pumped which will be assumed to be oil enters the centrifugal pumping element compartment from the left viewing Figure 1 through the inlet 39 and is delivered by the centrifugal pumping element 28 to the volute 37 and the outlet 38. A small proportion of the oil passes between the centrifugal pumping element and the left hand face 32 of the casing member 4 and circulates through the motor bearings and about the enclosure 34 and passes back into the centrifugal pumping element compartment through the passages 35, thus maintaining a constant circulation within the motor of a portion of the fluid being pumped to lubricate and cool the motor bearings and cool the motor, especially the rotor, but while remaining completely segregated from the rotor. The portion of the fluid being pumped which circulates through the motor is also segregated from the stator by the cylinder 62. That fluid circulates through the gap 44 as above explained.

The coolant 68 is maintained entirely separate from the portion of the fluid being pumped which cools the motor within the cylinder 62 so that the stator is largely cooled by the coolant 68 while the rotor is largely cooled by the portion of the fluid being pumped which is circulated about the rotor and through the bearings.

Connected with the casing member 3 are feet 81 through which the motor-pump unit may be fastened in operating position to any suitable supporting structure.

While I have shown and described a present preferred embodiment of the invention it is to be distinctly understood that the invention is not limited thereto but may be otherwise variously embodied wtihin the scope of the following claims.

I claim:

1. A motor-pump unit comprising a motor having a shaft carrying a rotor, a stator disposed about the rotor, a centrifugal pumping element carried by the shaft at one end of the motor, a casing about the centrifugal pumping element, an enclosure about the rotor, means conducting a portion of the fluid being pumped from the casing to the interior of the motor and against the outside of the enclosure to lubricate and cool the motor bearings and cool the rotor, a passage in the shaft terminating at one end within the enclosure and at the other end at an exposed portion of the shaft and removable means normally closing the passage.

2. A motor-pump unit comprising a motor having a shaft carrying a rotor, a stator disposed about the rotor, the stator having laminations, a centrifugal pumping element carried by the shaft at one end of the motor, a casing about the centrifugal pumping element, an enclosure about the rotor, means including a hollow cylinder segregating the stator from the remainder of the motor, means conducting a portion of the fluid being pumped from the casing to the interior of the hollow cylinder but outside the enclosure to cool and lubricate the motor bearings and cool the motor, a coolant separate from the fluid being pumped outside the hollow cylinder in thermoconductive relationship with the stator and in direct contact with the laminations of the stator, a passage extending from within the enclosure to a point outside the enclosure and removable means normally closing the passage.

3. A motor-pump unit comprising a motor having a shaft carrying a rotor, an enclosure about the rotor, a centrifugal pumping element carried by the shaft at one end of the shaft, a bearing for the shaft between the rotor and the centrifugal pumping element, a casing about the centrifugal pumping element, the casing having an inlet for fluid being pumped entering the casing at the side thereof disposed away from the motor and having a lateral outlet for fluid being pumped, and means forming a continuously open passage between the casing and the interior of the motor and through said bearing for admitting a small part only of the fluid being pumped into the motor and against the outside of the enclosure to lubricate and cool the motor bearings and cool the rotor without contact with the interior of the rotor.

4. A motor-pump unit comprising a motor having a shaft carrying a rotor, a stator disposed about the rotor, means for separately physically isolating each of the stator and the rotor, a centrifugal pumping element carried by the shaft at one end of the shaft, a bearing for the shaft between the rotor and the centrifugal pumping element, a casing about the centrifugal pumping element, the casing having an inlet for fluid being pumped entering the casing at the side thereof disposed away from the motor and having a lateral outlet for fluid being pumped, means forming a continuously open passage between the casing and the interior of the motor and through said bearing for admitting a small part only of the fluid being pumped into the motor and means at the interior of the motor including at least a portion of said isolating means maintaining said small part of the fluid being pumped and which passes through said passage out of contact with each of the rotor and stator but in thermoconductive relationship thereto and in contact with the motor bearings to lubricate and cool the same.

5. A motor-pump unit comprising a motor having a shaft carrying a rotor, a stator disposed about the rotor, a centrifugal pumping element carried by the shaft at one end of the shaft, a bearing for the shaft between the rotor and the centrifugal pumping element, a casing about the centrifugal pumping element, the casing having an inlet for fluid being pumped entering the casing at the side thereof disposed away from the motor and having a lateral outlet for fluid being pumped, an enclosure about the rotor, means including a hollow cylinder segregating the stator from the remainder of the motor and means forming a continuously open passage conducting a small part only of the fluid being pumped from the casing through said bearing to the interior of the hollow cylinder but outside the enclosure to cool and lubricate the motor bearings and cool the motor.

6. A motor-pump unit comprising a motor having a shaft carrying a rotor, a stator disposed about the rotor, a centrifugal pumping element carried by the shaft at one end of the shaft, a bearing for the shaft between the rotor and the centrifugal pumping element, a casing about the centrifugal pumping element, the casing having an inlet for fluid being pumped entering the casing at the side thereof disposed away from the motor and having a lateral outlet for fluid being pumped, an enclosure about the rotor, means including a hollow cylinder segregating the stator from the remainder of the motor, means forming a continuously open passage conducting a small part only of the fluid being pumped from the casing through said bearing to the interior of the hollow cylinder but outside the enclosure to cool and lubricate the motor bearings and cool the motor and a coolant separate from the fluid being pumped in thermoconductive relationship with the stator.

References Cited in the file of this patent

UNITED STATES PATENTS

| | | |
|---|---|---|
| 1,269,909 | Cooper | June 18, 1918 |
| 1,347,732 | Cooper | July 27, 1920 |
| 1,543,502 | Hobart | June 23, 1925 |
| 2,120,914 | Vogel | June 14, 1938 |
| 2,246,777 | Bordeaux et al. | June 24, 1941 |
| 2,318,786 | Korte et al. | May 11, 1943 |
| 2,517,233 | Peters | Aug. 1, 1950 |
| 2,518,597 | Brooks | Aug. 15, 1950 |
| 2,568,548 | Howard et al. | Sept. 18, 1951 |
| 2,649,048 | Pezzillo et al. | Aug. 18, 1953 |
| 2,649,049 | Pezzillo et al. | Aug. 18, 1953 |

FOREIGN PATENTS

| | | |
|---|---|---|
| 139,277 | Great Britain | Mar. 4, 1920 |
| 585,542 | Great Britain | Feb. 11, 1947 |